United States Patent [19]

Nakazawa

[11] 4,325,142
[45] Apr. 13, 1982

[54] PORTABLE RADIO SET WITH A CARRYING HOLDER

[75] Inventor: Kunihiro Nakazawa, Tokyo, Japan

[73] Assignee: Nippon Electric Co., Ltd., Tokyo, Japan

[21] Appl. No.: 172,377

[22] Filed: Jul. 25, 1980

[51] Int. Cl.³ .................... H04B 1/40; H04B 1/20
[52] U.S. Cl. ............................. 455/89; 455/95; 455/346; 455/351
[58] Field of Search ............... 455/89, 90, 95, 99, 455/100, 128, 344, 345, 346, 347, 348, 349, 350, 351, 354; 179/2 E, 1 E

[56] References Cited

U.S. PATENT DOCUMENTS

| | | | |
|---|---|---|---|
| 3,103,630 | 9/1963 | Pitts | 455/346 |
| 3,134,945 | 5/1964 | Wertheimer | 455/346 |
| 3,720,874 | 3/1973 | Gorcik | 455/89 |
| 4,046,973 | 9/1977 | Sato | 455/344 |
| 4,107,611 | 8/1978 | Holcomb | 455/95 |

FOREIGN PATENT DOCUMENTS 856753 12/1960 United Kingdom ............... 455/346

OTHER PUBLICATIONS

The All Transistor Portable Car Radio: 1956, by W. C. Sahm, Radio and TV News, Jan. 1959, pp. 62–63.

Primary Examiner—Jin F. Ng
Assistant Examiner—Tommy P. Chin
Attorney, Agent, or Firm—Laff, Whitesel, Conte & Saret

[57] ABSTRACT

A switch and an actuator therefore are arranged, respectively, on the portable radio unit and the carrying holder therefore in a manner such that, when the radio unit is inserted in the carrying holder, the switch is actuated to disconnect the microphone-speaker built in the radio unit or left intact, depending upon whether the radio unit is inserted with its grilled face directed backward or forward. With such arrangement, any unwanted increase in power consumption of the speaker circuit of the receiver or noise intrusion to the microphone circuit of the transmitter can be avoided even when an external microphone-speaker is connected to the radio unit. The built-in microphone-speaker can be used even in cases where the radio is carried on a person as at his waist.

10 Claims, 7 Drawing Figures

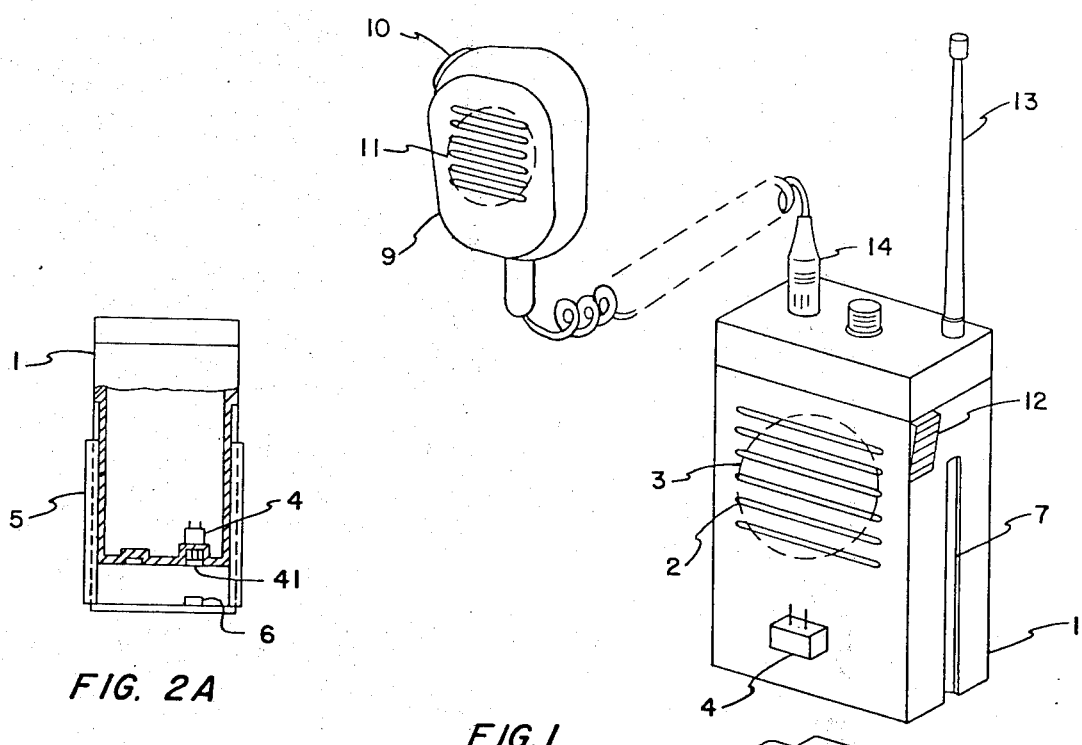
FIG. 2A
FIG. 1
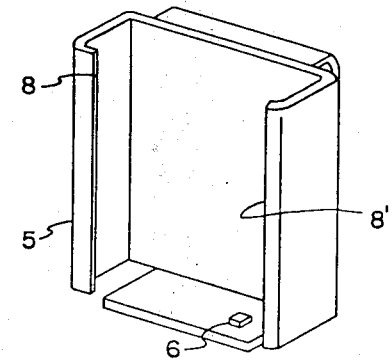
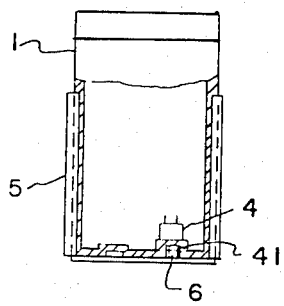
FIG. 2B
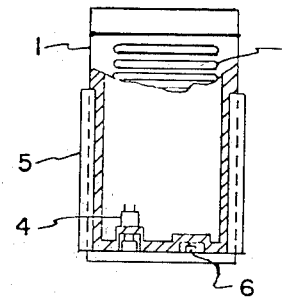
FIG. 2C

PORTABLE RADIO SET WITH A CARRYING HOLDER

BACKGROUND OF THE INVENTION

1. Field of the Invention

This invention relates generally to portable radio sets and, more particularly to those of the type having a built-in microphone-speaker and capable of being carried on a person as at his waist with the aid of a carrying holder with a separate microphone-speaker connected to the radio unit exteriorly thereof.

2. Description of the Prior Art

Generally, a portable radio set of the type concerned can serve with its internal or built-in microphone-speaker as a radio transmitter-receiver unit without involving any trouble, even if no external microphone-speaker is employed thereon. It can also serve the function of radio transmission and reception with a small-sized, external microphone-speaker connected by cable means to the radio unit besides the internal microphone-speaker. Use of such an external microphone-speaker is particularly desirable in cases where the radio set is used for an extended period of time or when the user's hands are full in some operation, since the radio set can be carried on the person as at his waist with the aid of a carrying device and the external microphone-speaker be secured, for example, to the lapel of his coat.

On the other hand, it is critically important with portable radio sets of the type concerned to minimize the power consumption without impairing the performance of the radio set. Heretofore, however, in cases where the radio is used with an external microphone-speaker connected thereto, the latter is connected in parallel or in series with the internal microphone-speaker. As the result, the total power consumption is increased in the case of parallel connection and the output sound level of each microphone-speaker is reduced in the case of series connection. Further, when one of the microphone-speakers is used as a microphone, noise from the other unused ones adversely affects the sound to be transmitted because both microphone-speakers are electrically connected to the transmitter.

SUMMARY OF THE INVENTION

Under these circumstances, the present invention has for its object the provision of a portable radio set of the type described which is designed so that its internal microphone-speaker can be efficiently connected and disconnected, as desired, in order to minimize the power consumption without impairing the performance of the radio unit.

Another object of the present invention is to provide a portable radio set of the character described which is highly waterproof.

According to the present invention, there is provided a combination of a portable radio unit and a carrying holder for the portable radio unit: the portable radio unit comprising first speaker means; speaker circuit means for supplying the first speaker means with an audible sound signal; and first switch means for connecting and disconnecting the first speaker means to and from the speaker circuit means by insertion into the carrying holder and removal therefrom of the portable radio unit.

The above and other objects, features and advantages of the present invention will become apparent from the following description when taken in conjunction with the accompanying drawings, which illustrate preferred embodiments of the invention.

BRIEF DESCRIPTION OF THE DRAWINGS

In the drawings:

FIG. 1 is an external oblique view of a preferred form of portable radio set embodying the present invention, which is comprised of a radio unit, an external microphone-speaker and a carrying holder;

FIGS. 2A, 2B and 2C are front elevational views, partly in cross section, of the portable radio set, explanatory of the manner in which the radio unit is inserted into the carrying holder;

FIG. 2A showing the radio unit inserted halfway into the holder with its grilled face directed backward to face the holder plate;

FIG. 2B showing the radio unit fully inserted in the holder; and

FIG. 2C showing the radio unit fully inserted with its grilled face directed forward;

DESCRIPTION OF THE PREFERRED EMBODIMENTS

Figure 3A:
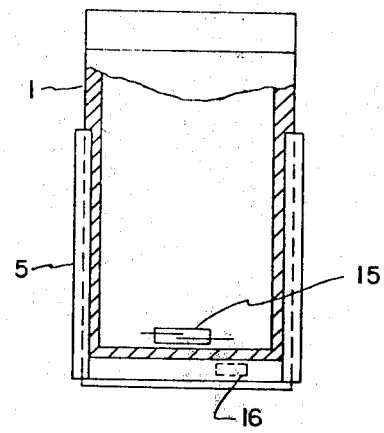
FIGS. 3A and 3B are views similar to FIGS. 2A, 2B and 2C, of another form of portable radio set embodying the present invention, showing the radio unit inserted in the carrying holder with the grilled face directed backward and forward, respectively.

Referring first to FIG. 1, which illustrates a preferred embodiment of the present invention, reference numeral 1 generally indicates the portable radio unit which includes an internal microphone-speaker 2 mounted inside of the grilled front face 3 of the radio unit and a nonlock type pushbutton switch 4 operative to connect and disconnect the internal microphone-speaker 2. For the controlling of the pushbutton switch 4 a projection 6 is provided on the bottom inside of the carrying holder 5. Reference numeral 9 indicates a handset including an external microphone-speaker 11 to be used when the internal microphone-speaker 2 is held off or disconnected and connectible to the radio unit 1 by means of a coupling plug 14.

The radio unit 1 is formed on the opposite lateral sides of its casing with grooves 7 for sliding engagement with opposite flanges 8 formed on the carrying holder 5. This enables the radio unit 1 to be inserted into the carrying holder 5 and securely held therein under the resilience of the flanges 8 and 8'. Reference numeral 13 indicates an antenna; and 10 and 12 indicate press-to-talk switches provided, respectively, on the handset 9 and the body of radio unit 1 for press-to-talk communication.

When the radio unit 1 partly slid in the carrying holder 5, as shown in FIG. 2A, is further slid to be completely inserted therein, the pushbutton or plunger 41 of the pushbutton switch 4 is pushed up by the projection 6, provided on the bottom inside of the carrying holder 5, so as to be opened to disconnect the internal microphone-speaker 2. In this instance, it is to be noted that the radio unit 1 is inserted in the holder 5 with its front speaker grille side 3 (FIG. 1) directed backward to face the back plate of the holder 5 so as to be covered thereby and that the projection 6 and pushbutton switch 4 are arranged in respective positions on the carrying holder 5 and the radio unit 1 for engagement with each other only when the radio unit is so inserted. In this positional relationship, it will be readily noted that, when the radio unit 1 is inserted into the carrying holder 5 with the speaker grille side 3 directed forward or to the front side of the carrying holder 5, as shown in FIG. 2C, the pushbutton switch 4 is left clear of the projection 6, and the internal microphone-speaker 2 remains electrically connected. Such arrangement is particularly advantageous in that it enables communication through the internal microphone-speaker 2 of the radio unit with no external microphone-speaker connected thereto even in cases where the radio unit 1 is carried on a person as at his waist with the aid of the carrying holder 5.

The above-described form of switch 4 is advantageous in that, unlike any active-element switch, it does not need any control current, but involves some problems particularly with respect to the mounting space required and the waterproofness of the radio unit. Such problems are overcome in another embodiment of the present invention, which will be described below.

Figure 3B:
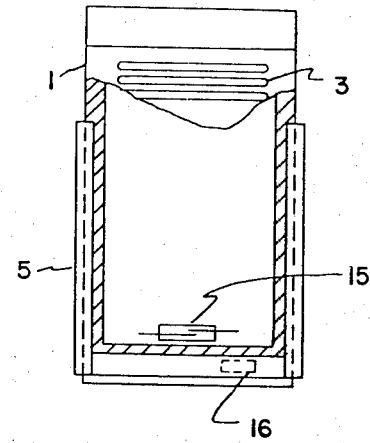

FIGS. 3A and 3B illustrate one form of such improved embodiment of the present invention. In the embodiment, a reed switch 15 is employed as a switch means for connecting and disconnecting the internal microphone-speaker and a magnet 16 is mounted on the bottom inside of the carrying holder 5 to serve the purpose of controlling the reed switch 15. When the radio unit 1 is inserted into the carrying holder 5 with the microphone-speaker grille 3 directed backward to face the back plate of the holder 5, as shown in FIG. 3A, the reed switch 15 on the radio unit comes to be operated by the magnet 16 to disconnect the internal microphone-speaker. On the other hand, if the radio unit is inserted with its grille side directed oppositely, the reed switch 15 does not operate, leaving the internal microphone-speaker connected. Such switch operation or nonoperation is attainable by an appropriate combination of the operating polarity of reed switch 15 and the polarity of magnet 16.

As is well known in the art, reed switches generally include a pair of normally spaced opposite reeds of ferromagnetic material which are held enclosed in a glass tube and the free ends of which are attracted to each other into contact when the switch is subjected to a magnetic field directed axially thereof. In the embodiment illustrated, the reed switch 15 is arranged in the radio unit 1 and is controllable by the magnet 16 mounted on the carrying holder 5. As will be readily recognized, the switch construction shown in FIGS. 3A and 3B is highly waterproof, involves no extra current consumption and is much reduced in space requirement.

Figure 4:
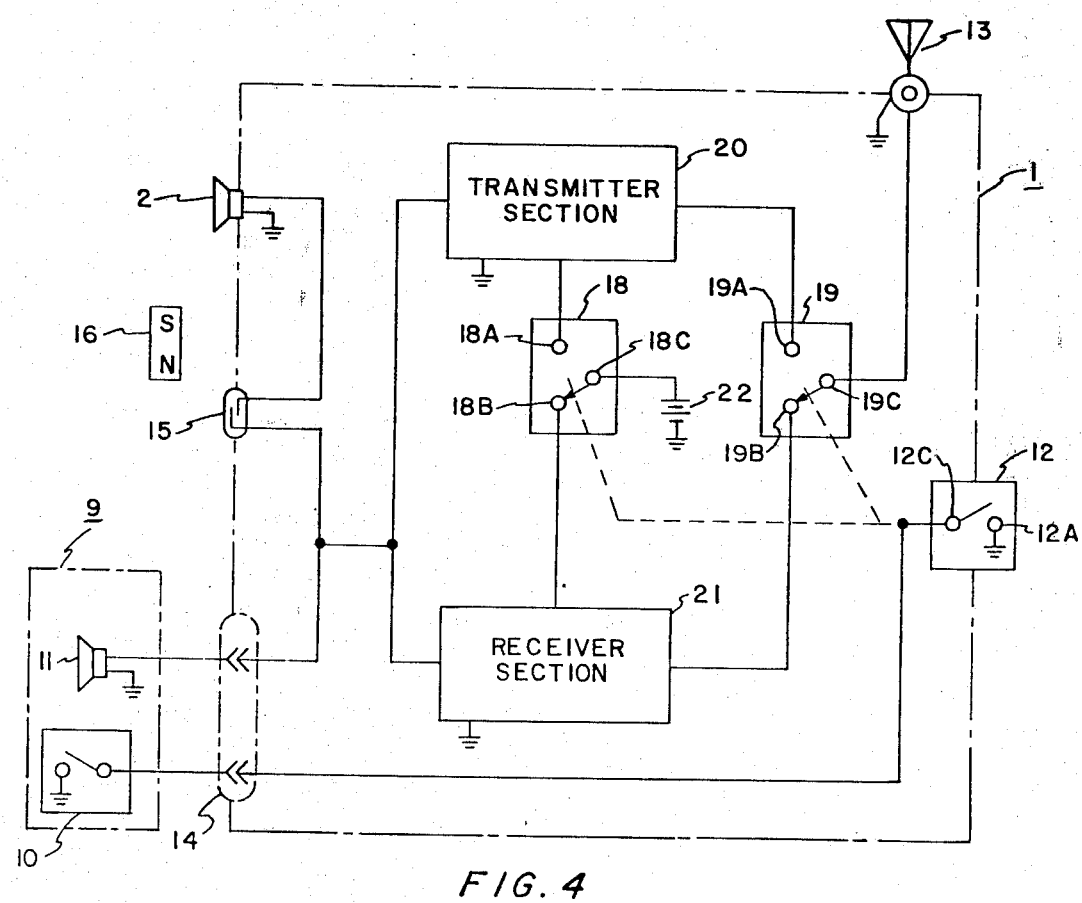
FIG. 4 is a schematic circuit diagram of the portable radio set, explanatory of the operating principle thereof.

Description will next be made of the electrical operation of the portable radio set of the present invention with reference to FIG. 4. First, the operation of the radio set when used for press-to-talk communication with the handset 9 disconnected from the radio unit 1.

For reception, the press-to-talk switch 12 mounted on the radio unit is left open, as shown, and the terminal 18c in the switch circuit 18 is held connected to the terminal 18b so that the receiver section 21 is supplied with the power of battery 22. At the same time, the antenna switch circuit 19 is held in the state having the terminals 19b and 19c connected to each other, as shown, to direct the signal input received at antenna 13 to the receiver section 21. The reed switch 15 is electrically closed to connect the microphone-speaker 2 to the receiver section 21 and transmitter section 20 by taking the magnet 16 apart from the radio unit or inserting the radio unit into the carrying holder as shown in FIG. 3B. The switch circuits 18 and 19 are schematically illustrated for showing their function described above, which may be composed of a transistor and a diode, respectively. The receiver section 21 is a receiver unit generally used in a phase-modulation (PM), frequency-modulation (FM) or other modulation system and ending with a demodulated audio output circuit. In the circuit state illustrated, when the radio signal is received at the antenna 13, it is demodulated at the receiver section 21 and is outputted through the internal microphone-speaker 2 as an audible sound.

For transmission, the press-to-talk switch 12 is pressed to bring its terminal 12c into contact with terminal 12a so that, in the switch circuit 18, its terminals 18a and 18c are connected to each other and, in the switch circuit 19, its terminals 19a and 19c are connected to each other. Accordingly, as long as the reed switch 15 is held closed, the audible sound signal inputted by way of the internal microphone-speaker 2 is modulated at the transmitter section 20 and then radiated outwardly from the antenna 13. The transmitter section 20 may take the form of a transmitter unit quite the same as that commonly used in a PM or FM system and ending with a power amplifier.

Further, when the handset 9 is connected to the radio unit 1 by coupling plug 14, the external microphone-speaker 11 is connected to the same junction as the internal mircophone-speaker 2, that is, to the junction between the voice-signal output end of receiver section 21 and the voice-signal input end of transmitter section 20. At the same time, the external press-to-talk switch 10 on the handset 9 is connected, like the press-to-talk switch 12 on the radio unit 1, to the control terminal for controlling the switch circuits 18 and 19. In this state, when the reed switch 15 is brought closely enough to the magnet 16 to be opened, as in the case of FIG. 3A, the internal microphone-speaker 2 is disconnected or made OFF. In this manner, the external microphone-speaker 11 and the press-to-talk switch 10 on the handset are substituted, respectively, for the internal microphone-speaker 2 and the press-to-talk switch 12 on the radio unit 1, enabling the radio set to operate, for press-to-talk communication, in quite the same fashion as when the reed switch 15 is held closed without use of the handset 9.

To summarize, the portable radio set of the present invention is so constructed and arranged that the microphone-speaker built in the radio unit can be connected or disconnected as it is inserted into the carrying holder with the microphone-speaker grille side of the radio unit directed backward or forward of the carrying holder, as desired. The switch for connecting and disconnecting the internal microphone-speaker may take the form of a pushbutton switch or a reed switch and the radio unit is also usable with an external microphone-speaker connected thereto. It will be recognized, therefore, that, according to the present invention, a portable radio set has been realized which is highly efficient in use and materially reduced in power consumption. Further, according to the present invention, it will be appreciated that a portable radio set is obtainable which is highly waterproof with a reed switch and a magnet employed for connection and disconnection of the microphone-speaker built in the radio unit.

Though a few preferred embodiments have been shown and described herein, it is to be understood that various changes and modifications may be made therein without departing from the spirit or scope of the invention as defined in the appended claims.

What is claimed is:

1. A combination of a portable radio unit and a carrying holder for said portable radio unit, said portable radio unit having a grilled front face, first speaker means mounted so that audible sound from said first speaker means is radiated through said grilled front face, speaker circuit means for supplying said first speaker means with an audible sound signal, and first switch means for connecting and disconnecting said first speaker means to and from said speaker circuit means, said carrying holder having a switch member mounted thereon for activating said first switch means, wherein said first switch means and said switch member are respectively arranged, on said portable radio unit and said carrying holder in positions which are such that said first switch means is operated only when said portable radio unit is inserted into said carrying holder with said grilled front face oriented to be covered by said carrying holder, said first switch means being unoperated when said portable radio unit is inserted into said carrying holder with said grilled front face directed to be visible from outside.

2. A combination of a portable radio unit and a carrying holder for said portable radio unit, said portable radio unit having a grilled front face, first microphone means mounted therein to receive audible sound through said grilled front face, microphone circuit means for receiving from said microphone means a signal responsive to an audible sound, and first switch means for connecting and disconnecting said first microphone means to and from said microphone circuit means, said carrying holder having a switch member mounted thereon for activating said first switch means, wherein said first switch means and said switch member are respectively arranged, on said portable radio unit and said carrying holder in positions such that said first switch means is operated only when said portable radio unit is inserted into said carrying holder with said grilled front face directed to be covered by said carrying holder, said first switch means being unoperated when said portable radio unit is inserted into said carrying holder with said grilled front face directed so as to be visible from outside.

3. A combination of claim 1, wherein said portable radio unit further comprises first microphone means combined with said first speaker means; microphone circuit means for receiving an audible sound signal from said first microphone means; and second switch means for selectively actuating said speaker and microphone circuit means.

4. A combination of claim 2, wherein said portable radio unit further comprises first speaker means combined with said first microphone means; speaker circuit means for supplying said first speaker means with an audible sound signal; and second switch means for selectively actuating said microphone and speaker circuit means.

5. A combination of claim 1, wherein said portable radio unit further comprises hand set means including second speaker means connected to said speaker circuit means.

6. A combination of claim 2, wherein said portable radio unit further comprises hand set means including second microphone means connected to said microphone circuit means.

7. A combination of claim 3, wherein said portable radio unit further comprises a third switch means and hand set means including second speaker and microphone means alternatively connected to said speaker and microphone circuit means by said third switch means, said third switch means being coupled to said second switch means.

8. A combination of claim 4, wherein said portable radio unit further comprises a third switch means and hand set means including second speaker and microphone means alternatively connected to said speaker and microphone circuit means by said third switch means, said third switch means being coupled to said second switch means.

9. A combination of any one of the claims 1-8, wherein said first switch means includes a reed switch and said switch member includes a magnet.

10. A combination of any one of the claims 1-8, wherein said first means includes a pushbutton type switch and said switch member includes a switch-button to be engaged with said pushbutton type switch.

* * * * *